(12) United States Patent
Van Meijl

(10) Patent No.: US 10,022,863 B2
(45) Date of Patent: Jul. 17, 2018

(54) DEVICE FOR SUPPORTING AN OBJECT SUCH AS AN ITEM OF LUGGAGE AS WELL AS AN ASSOCIATED METHOD

(71) Applicant: Vanderlande Industries B.V., Veghel (NL)

(72) Inventor: Erik Wilhelmus Petronella Van Meijl, Veghel (NL)

(73) Assignee: Vanderlande Industries B.V., Veghel (NL)

( * ) Notice: Subject to any disclaimer, the term of this patent is extended or adjusted under 35 U.S.C. 154(b) by 60 days.

(21) Appl. No.: 15/319,261

(22) PCT Filed: Jun. 10, 2015

(86) PCT No.: PCT/NL2015/050418
§ 371 (c)(1),
(2) Date: Dec. 15, 2016

(87) PCT Pub. No.: WO2015/194942
PCT Pub. Date: Dec. 23, 2015

(65) Prior Publication Data
US 2017/0136625 A1    May 18, 2017

(30) Foreign Application Priority Data
Jun. 16, 2014   (NL) ..................... 2013002

(51) Int. Cl.
| | | |
|---|---|---|
| *G05B 15/00* | (2006.01) | |
| *B25J 9/16* | (2006.01) | |
| *B25J 9/00* | (2006.01) | |
| *B64F 1/36* | (2017.01) | |
| *B66C 23/18* | (2006.01) | |
| *B66C 13/22* | (2006.01) | |
| *B66C 23/16* | (2006.01) | |

(52) U.S. Cl.
CPC .......... *B25J 9/1615* (2013.01); *B25J 9/0018* (2013.01); *B25J 9/0093* (2013.01); *B64F 1/368* (2013.01); *B66C 13/22* (2013.01); *B66C 23/16* (2013.01); *B66C 23/18* (2013.01); *Y10S 901/02* (2013.01); *Y10S 901/23* (2013.01); *Y10S 901/30* (2013.01)

(58) Field of Classification Search
None
See application file for complete search history.

(56) References Cited

U.S. PATENT DOCUMENTS 3,916,279 A    10/1975 Kawano et al.
2008/0173500 A1    7/2008 Shimizu et al.

FOREIGN PATENT DOCUMENTS

WO    2012/087192 A1    6/2012

OTHER PUBLICATIONS

International Search Report and Written Opinion corresponding International Application No. PCT/NL2015/050418; dated Sep. 28, 2015; 8 pages.

*Primary Examiner* — Bhavesh V Amin
(74) *Attorney, Agent, or Firm* — Shumaker, Loop & Kendrick, LLP

(57) ABSTRACT

A device for supporting a luggage item including a vertical base member, an arm, and carrying-element having a support surface. A guide guides vertical movement of the arm along a length of the base member, a driver drives vertical arm movement, a sensor determines force acting on the carrying element, a position sensor determines a vertical position and speed of the arm, and a controller controls the driver and sets a support force based on the determined vertical speed position of the arm.

19 Claims, 7 Drawing Sheets

# DEVICE FOR SUPPORTING AN OBJECT SUCH AS AN ITEM OF LUGGAGE AS WELL AS AN ASSOCIATED METHOD

TECHNICAL FIELD AND BACKGROUND OF THE INVENTION

The present invention relates to a device for supporting an object such as an item of luggage.

Such devices are generally used for loading a container, such as a Unit Load Device (ULD), with suitcases, which are typically supplied on a conveyor belt. The luggage is usually transported in such a ULD in the hold of an aeroplane.

A known device is disclosed in U.S. Pat. No. 3,916,279, which discloses an apparatus for compensating mechanical loss produced in a load-moving or transporting machine in which a load can be moved by exerting a small external force as if the load were positioned in a space free from gravity or gravitational influence by constantly producing a force from an electric motor, which force is equal to the weight of the load.

Another known device is disclosed in WO 2012/087192, which device comprises a rectangular table dimensioned so that the greater part of the items of luggage present on the load-carrying surface fits within the circumference of the load-carrying surface. The load-carrying surface comprises freely rotatable balls, on which an item of luggage is supported, enabling an operator to move an item of luggage with relatively little force, for example from a conveyor belt onto the load-carrying surface or from the load-carrying surface into a container.

An operator must move the items of luggage sideways relative to himself both during the loading of the carrying element and during the unloading of the carrying element, which is disadvantageous from an ergonomic point of view.

The carrying element is furthermore foldably connected to an elongate, vertically extending base member, which is suspended from a slide, being pivotable about a vertical pivot axis. The slide can move forward and backward in horizontal direction along a guide between a loading position and an unloading position. The carrying element can move vertically up and down along the base member. This device is a so-called active system. This implies that the device comprises an active drive system, for example comprising an electric motor or a pneumatic drive unit, which is capable inter alia of independently moving the table with an item of luggage present thereon up or down along the base member. The drive system is also configured to provide the horizontal movement of the slide. To move the carrying element in horizontal or vertical direction, the operator operates a joystick, using one hand, by means of which the drive system can be controlled. The joystick is provided on the base member. Using his other hand, the operator pushes against the carrying element or against an item of luggage present on the carrying element so as to cause the carrying element and the item of luggage to pivot relative to the base member during horizontal movement of the base member.

International patent application WO 2012/087192 also discloses a device for supporting items of luggage. In said device, use is made of a table which is comparable, in any case as regards its dimensions and configuration, to the table which is horizontally movable relative to a carrier. The table can move vertically up and down along a column. The column is in turn horizontally movable along the front side of an open container. To effect the vertical movement of the table, the device is provided with a handle, by which means (not shown or described) for vertically adjusting the table can be controlled.

In addition to the above-mentioned devices, there is also known a passive device for supporting an item of luggage. In a passive system, it is in principle the operator who moves the load-carrying surface, but the device provides support to the operator in moving the load-carrying surface, at least upon vertical movement thereof. Because of said support, the operator does not experience the full weight of the item of luggage with the carrying element when moving the load-carrying surface in vertical direction, but only a (small) part thereof. Whereas in active systems it is the operator who follows the movements of the carrying element as effected by the active drive system, in passive systems, on the other hand, it is the device that follows and supports the movements of the carrying element as effected by the operator. Operators generally experience such an operation as more intuitive and more pleasant.

BRIEF SUMMARY OF THE INVENTION

The object of the invention is to provide a device for supporting an object, such as an item of luggage, wherein the device provides support to the operator in moving the item of luggage, and wherein the device is configured to prevent or oppose the occurrence of exceptional situations. In order to achieve that object, the invention, in a first aspect, provides a device for supporting an object, such as an item of luggage, comprising:

a base member;

an arm that connects to the base member with a first end;

a carrying element having a load-carrying surface for supporting the item of luggage, which carrying element is provided at the second end of the arm opposite the first end;

moving means for moving the arm with the carrying element in vertical direction relative to the base member;

drive means for providing a support force for supporting the item of luggage on the load-carrying surface of the carrying element;

measuring means for determining a force that acts between the carrying element and the second end of the arm;

control means for controlling the drive means for setting the support force on the basis of the determined force;

position determining means for determining a vertical position of the arm relative to the base member;

wherein:

the position determining means are further configured for determining a vertical speed of the arm, and wherein the control means are also configured for controlling the drive means for setting the support force on the basis of the vertical speed and the vertical position of the arm as determined.

The inventor has realised that an exceptional situation that may occur is related to the vertical speed and the vertical position of the arm. A situation in which the arm is for example in a relatively high vertical position relative to the base member, with the arm moving upward at a relatively high vertical speed, should be opposed or prevented. After all, this might lead to a dangerous situation. A dangerous situation could arise, for example, in the case of the arm bumping against an end stop at a relatively high speed. This could cause a shock on the objects present on the carrying element, possibly resulting in the object falling from the carrying element.

The same goes, for example, for a situation in which the arm is in a relatively low vertical position, with the arm moving down at a relatively high vertical speed.

Within the context of the present patent application, the base member is understood to be an elongate, vertically extending member, wherein the arm can be moved up and down along part of the length of the vertical member. A typical length of the base member is in the order of 1-4 m. A typical range over which an operator can move the carrying element, and thus also the arm, is 1-2 m.

The moving means form the connection between the drive means and the arm, such that the drive means are capable of exerting a force on the arm via the moving means. The moving means for example comprise a guide over which the arm can be moved up and down.

The drive means comprise one of pneumatic drive means, hydraulic drive means and electric drive means, for example, for generating the support force that is provided to the arm via the moving means.

According to the present invention, the measuring means for determining a force that acts between the carrying element and the second end of the arm can be mounted at various locations in the device. The measuring means may comprise a weighing cell, for example, i.e. an electronic sensor that is used for converting a force into an electrical signal. The weighing cell can for example be mounted between the carrying element and the arm, between the arm and the moving means or be incorporated in the load-carrying surface of the carrying element. In another embodiment, the measuring means may comprise a torque sensor on a shaft of the drive means. The inventor has realised that a weighing cell mounted between the carrying element and the arm is to be preferred, since the accuracy of the force determination increases as the weighing cell is mounted closer to the place where the force is exerted by the operator. The determined force may also comprise the force exerted by the object, i.e. the force of gravity on the object. Within the context of the present patent application, this is the carrying element.

The position determining means comprise, for example, an encoder which is configured to generate pulses upon rotation of a shaft. The number of pulses can be converted into an angle of rotation or a distance of translation, such that the vertical position of the arm can be determined. The position determining means are configured, in one example, to determine the vertical speed of the arm by differentiating the vertical position of the arm over time.

Within the context of the present application, the vertical speed of the arm is determined by the position determining means. Since the object, for example the item of luggage, is present on the load-carrying surface of the carrying element, which carrying element is connected to the second end of the arm, the vertical speed of the arm thus equals the vertical speed of the carrying element or the object that is present on the carrying element, i.e. supported on the carrying element.

The device according to the present invention is primarily suitable for supporting items of luggage, such as suitcases, but it can also be used for supporting all kinds of other objects, such as (postal) parcels and the like.

In an advantageous embodiment, the vertical speed of the arm comprises a soft speed limit and a higher hard speed limit, wherein:

the control means are configured to control the drive means such that a speed-reducing support force is provided to the moving means on the basis of the determined force when the vertical speed of the arm is higher than the soft speed limit and lower than the hard speed limit;

the control means are configured to block the moving means when the vertical speed of the arm higher than the hard speed limit;

the control means are configured to control the drive means such that a full support force is supplied to the moving means on the basis of the determined force when the vertical speed of the arm is lower than the soft speed limit.

In this embodiment the control means are configured to control the drive means in three different ways. This is advantageous, inter alia for ergonomic reasons, for an operator who controls the device. It has been realised that a direct changeover from full support of the object to a complete blockage of the moving means when the vertical speed of the arm exceeds a hard speed limit is undesirable. Introducing a soft speed limit makes it possible to provide a speed-reducing support force to the moving means, which speed-reducing support force is according to the present invention used between the soft speed limit and the hard speed limit.

An operator will thus sense that the support of the object between the soft speed limit and the hard speed limit is lost, for example partially, so that it will be clear to the operator that the hard speed limit is approaching and it will be more difficult for the operator to reach this hard speed limit.

Blocking according to the present invention also comprises the gradual stopping of the arm through the use of a braking distance of the like.

In another advantageous embodiment, the soft speed limit depends on the vertical position of the arm relative to the base member.

The above embodiment relates inter alia to an exceptional situation in which the arm approaches vertical end positions. As explained above, a typical length of the base member is in the order of 1-4 m, such that an operator can move the carrying element, and thus also the arm, over this range. The inventor has realised that an exceptional situation can arise when the arm approaches one of the ends of said range, i.e. one of the vertical end positions. In order to prevent this, the soft speed limit can according to the present invention be reduced, for example, near a vertical end position. The result of this is, for example, that an operator will enjoy full support when the arm is not positioned near an end position, and that a speed-reducing support force is sensed by the operator when, on the other hand, the arm is positioned near an end position.

In an advantageous embodiment, the soft speed limit comprises a soft downward speed limit and a soft upward speed limit.

The advantage of this embodiment is that different soft speed limits can be set in the device for a speed of the arm in downward direction and a speed of the arm in upward direction.

In another advantageous embodiment, the soft downward speed limit is decreased at least in part as the arm moves downward relative to the base member, and the soft upward speed further limit is decreased as the arm moves upward relative to the base member.

The advantage of this embodiment is that the operator is induced, as it were, to lead the object, and thus also the carrying element and the arm, away from an end position. When the arm is moved upwards toward a high vertical end position, for example, the soft upward speed limit will be decreased. This will not affect the soft downward speed limit, so that an operator will experience full support over a greater downward speed range in comparison with the upward speed range over which he will experience full support. The same principle applies to the situation in which the arm approaches a low vertical end position, in which case the operator will experience full support over a greater upward speed range.

The downward speed range comprises speed zero up to and including the currently allowed downward speed for a particular vertical position. The same applies as regards the upward speed range.

In another embodiment, the hard speed limit comprises a hard downward speed limit and a hard upward speed limit.

The advantage of this embodiment is that different hard speed limits can be set in the device for an upward speed of the arm and a downward speed of the arm.

In one embodiment, the invention provides a device for supporting an object, such as an item of luggage, comprising:
 a base member;
 an arm that connects to the base member with a first end;
 a carrying element having a load-carrying surface for supporting the item of luggage, which carrying element is provided at the second end of the arm opposite the first end;
 moving means for moving the arm with the carrying element in vertical direction relative to the base member;
 drive means for providing a support force for supporting the item of luggage on the load-carrying surface of the carrying element;
 measuring means for determining a force that acts between the carrying element and the second end of the arm;
 control means for controlling the drive means for setting the support force on the basis of the determined force;
 wherein:
 the measuring means are configured for determining a weight of the item of luggage when the arm is not being moved in vertical direction;
 the control means are configured for determining a vertical acceleration of the arm and for blocking the moving means when the determined vertical acceleration of the arm exceeds a maximum acceleration value and/or when the determined vertical acceleration exceeds a predetermined speed limit dependent on the determined weight of the item of luggage.

The inventor has realised that an exceptional situation that may occur is related to the vertical acceleration of the arm. The vertical acceleration of the arm, and thus also the vertical acceleration of the carrying element and the object, depends, among other things, on the support force, the mass of the arm and/or the mass of the carrying element and/or the mass of the object, and depends on the external force exerted by an operator. This external force is exerted on the carrying element, for example, or on the object or the arm by the operator.

This exceptional situation is in principle directly related to the external force exerted on, for example, the carrying element by an operator. It has been realised that an exceptional situation will arise when an external force exceeds a predetermined value. This predetermined value is for example related to the force that one operator can exert. According to the present invention, an exceptional situation occurs if it appears that an external force is being exerted which is higher than the force that one operator is generally capable of exerting. This situation may occur, for example, in the case of incorrect use or a malfunction in the device. When such a situation arises, the control means must block the moving means.

The above situation can be directly related to the acceleration of the arm. The inventor has realised that the external force being exerted by the operator can be reduced to the acceleration of the arm if the mass that is being moved is known.

A dangerous situation is prevented in this way, as the moving means are blocked upon detection of the above-described exceptional situation.

In one embodiment, the acceleration limit is decreased linearly as weights increase.

In another embodiment, the control means are configured for determining the vertical acceleration of the arm on the basis of the force determined by the measuring means or on the basis of determined vertical positions of the arm relative to the base member or on the basis of an acceleration sensor. The acceleration sensor may be mounted on the arm, the carrying element or the moving means, for example.

In another embodiment, the carrying element is at least substantially disc-shaped. When such a shape is used, the direction from which the carrying element is approached is in principle irrelevant.

In yet another embodiment, the arm is of the telescopic. In this way a degree of freedom in horizontal direction can be obtained for the carrying element in a constructionally simple manner. Alternatively, the arm could be an articulated arm, for example, in which case a number of arm parts, for example two arm parts, will be pivotally interconnected.

In one example, the device comprises operating means to be operated by an operator, which operating means are provided with a control unit that can be operated by the operator with one hand for activating the control means, which control unit is provided on the carrying element.

In another example, the device comprises indicator means connected to the operating means, which indicator means are configured to deliver a visual indication when the control means are activated.

In another example, the carrying element is connected to the arm via the measuring means in such a manner as to be freely rotatable about a vertical axis of rotation.

Within the context of the present invention, a module, device, apparatus, equipment or the like may also be implemented as a computer programme that runs on a processing unit, processor.

The names of the various aspects of the system, the method and the central control means according to the invention must not be interpreted literally. The names used herein are merely intended to express the idea underlying the aspect in question in a concise manner.

In a second aspect, the invention further comprises a method for supporting an object, such as an item of luggage, characterised by using the device according to one of the above-discussed embodiments, which method is characterised by the steps of:
 the measuring means determining a force that acts between the carrying element and the second end of the arm;
 the position determining means determining a vertical position of the arm;
 the position determining means determining a vertical speed of the arm;
 the control means controlling the drive means for setting the support force on the basis of the determined force, the determined vertical speed and the determined vertical position of the arm.

Various aspects that play a part in embodiments of the methods according to the present invention, including the advantages thereof, correspond to aspects that play a part in the device according to the invention as already explained in the foregoing.

In one embodiment, the vertical speed of the arm comprises a soft speed limit and a higher hard speed limit, wherein the method comprises the steps of:

the control means controlling the drive means such that a speed-reducing support force is provided to the moving means on the basis of the determined force when the vertical speed of the arm is higher than the soft speed limit and lower than the hard speed limit;

the control means blocking the moving means when the vertical speed of the arm is higher than the hard speed limit;

the control means controlling the drive means such that a full support force is provided to the moving means on the basis of the determined force when the vertical speed of the arm is lower than the soft speed limit.

In another embodiment, the soft speed limit depends on the vertical position of the arm relative to the base member.

In another embodiment, the soft speed limit comprises a soft downward speed limit and a soft upward speed limit.

In yet another embodiment, the soft downward speed limit is decreased at least in part as the arm moves downward relative to the base member, and the soft upward speed limit is decreased as the arm moves upward relative to the base member.

In one embodiment, the hard speed limit comprises a hard downward speed limit and a hard upward speed limit.

In another embodiment, the invention provides a method for supporting an object, such as an item of luggage, characterised by using a device according to one of the above-discussed embodiments, which method comprises the steps of:

the measuring means determining the weight of the item of luggage and the carrying element when the arm is not being moved in vertical direction;

the control means determining the vertical acceleration of the arm;

the control means blocking the moving means when the determined vertical acceleration of the arm exceeds a maximum acceleration and/or when the determined vertical acceleration exceeds a predetermined speed limit dependent on the determined weight of the item of luggage.

In one embodiment thereof, the acceleration limit is decreased linearly as weights increase.

In another embodiment thereof, the step of determining the vertical acceleration comprises the step of:

the control means determining the vertical acceleration of the arm on the basis of the force determined by the measuring means or on the basis of determined vertical positions of the arm relative to the base member.

In yet another embodiment, the device used in the method further comprises operating means to be operated by an operator, which operating means are provided with a control unit that can be operated by the operator with one hand for activating the control means, which control unit is provided on the carrying element, and furthermore with indicator means connected to the operating means, which indicating means are configured to deliver a visual indication when the control means are activated. The method in this case comprises the step of:

the indicator means delivering the visual indication when the control means are activated.

The advantages of the various embodiments of the method according to the present invention in particular concern the ergonomically sound and pleasant (for an operator) manner in which a container can be loaded with objects, such as items of luggage, by means of such a method, whilst preventing the occurrence of exceptional situations in the device.

BRIEF DESCRIPTION OF THE DRAWINGS

The invention will now be explained in more detail by means of a description of possible embodiments of a device according to the invention for supporting an object, such as an item of luggage, in which reference is made to the following figures.

DETAILED DESCRIPTION OF THE INVENTION

Figure 1:
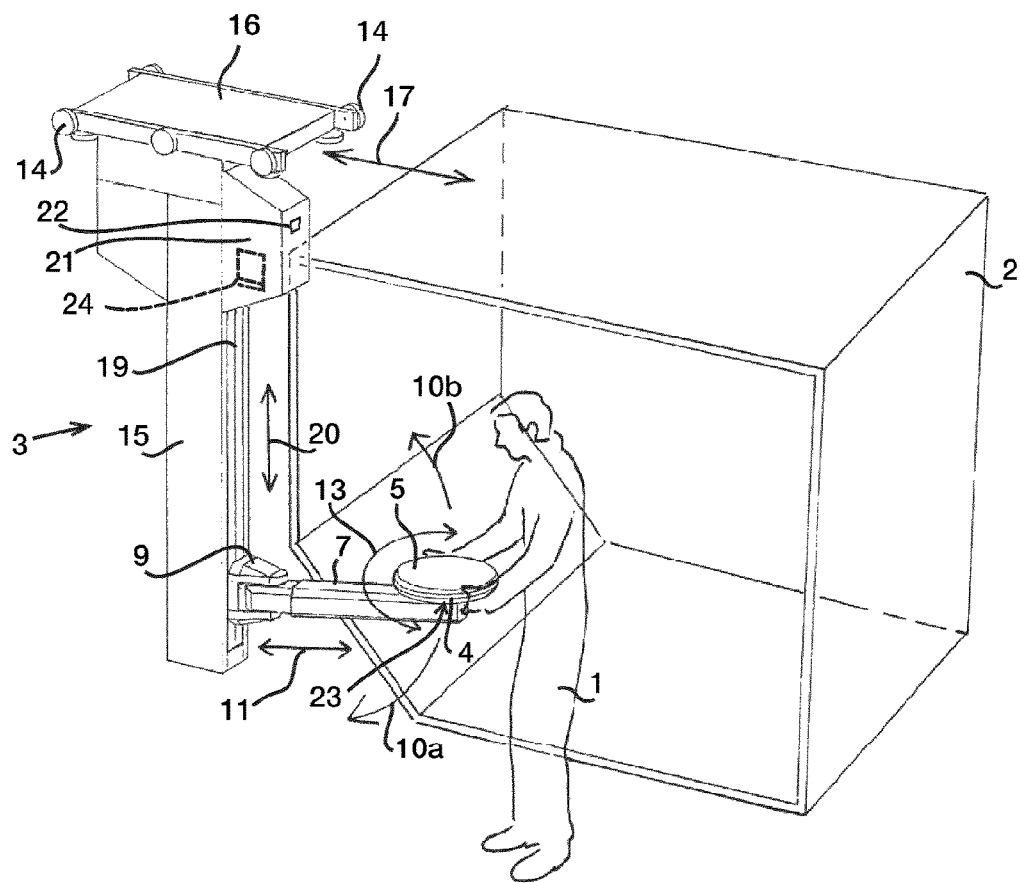
FIG. 1 shows an operator positioned near a device according to the invention and a container.

FIG. 1 shows an operator 1 positioned near a container 2 to be loaded with items of luggage. The container 2 is of the so-called Unit Load Device (ULD) type, designed to be transported in an aeroplane. Items of luggage with which the container 2 is to be loaded are typically suitcases, bags and backpacks, which are typically supplied to the operator 2 via a supply conveyor (see reference numeral 42 in FIG. 2 and FIG. 3a). The supply conveyor is not shown in FIG. 1 so as to illustrate the general method of operation of the operator more clearly. The operator 1 makes use of a device 3 for loading the container 2. The device 3 comprises a disc-shaped carrying element 4 provided with a load-carrying surface 5 at the upper side. The diameter of the carrying element is about 45 cm; in general it is preferably at most 60 cm, or more preferably at most 50 cm. When the container 2 is being loaded with an item of luggage 6, the item of luggage 6 is present on the load-carrying surface 5. The carrying element 4 is provided at the free end of a pivot arm 7, where it is freely rotatable as indicated by the double arrow 13 about an axis of rotation that coincides with the central axis of the disc shape. The pivot arm 7 is connected to a guide body 9 for pivoting movement about a vertical pivot axis in the directions indicated by the arrows 10a, 10b. The pivot arm is of the telescopic type, so that the carrying element 4 is movable in directions toward and away from the pivot axis as indicated by the double arrow 11. The device 3 comprises a base member 15, which is at least substantially elongate in shape and which is vertically oriented. The base member 15, to which the pivot arm 7 is connected via the guide body 9 is suspended from a slide 16 of the device 3, which can move forward and backward in horizontal direction along a rail as indicated by the double arrow 17, for which purpose the slide 16 is provided with a number of wheels 14. The base member 15 comprises moving means 19, along which the guide body 9 can move vertically up and down as indicated by the double arrow 20, the range of movement being practically the same as the height of the container 2. The lower end of the base member 15 is clear of the ground on which the container 2 is supported and the operator 1 is standing.

By making use of the degrees of freedom indicated by the arrows 10*a*, 10*b*, 11 and 20, the operator 1 can move the carrying element 4 to any desired position within the container 2 for loading the container 2. The device 3 is configured to support a vertical force exerted on the carrying element 4 by the operator 1. This support is such that the actual force to be exerted on the carrying element 4 by the operator 1 for moving the carrying element 4 with the item of luggage 6 present thereon up and down is so small that the operator 1 will be able to keep this up for a long time without any objection, for example from the viewpoint of Occupational Health and Safety. The actual force to be exerted by the operator 1 is for example typically less than 250 Newton, or even less than 50 Newton.

In one example, the full support force equals the force of gravity exerted on the object, or on the object including the carrying element. To set the carrying element moving, i.e. accelerate the carrying element, the operator needs to exert a force that is related to the mass of the object, or to the mass of the object and the carrying element. The operator thus need not produce a force to compensate for the force of gravity being exerted on the object. This force is compensated by the full support force according to the present invention.

To support the aforesaid force exerted by the operator 1 by means of the device 3, the device 3 comprises driving means 21 for providing a support force for supporting the item of luggage 6 on the load-carrying surface 5 of the carrying element 4, measuring means 23 for determining a force that acts between the carrying element 4 and the second end of the pivot arm 7, control means 21 for controlling the driving means 21 for setting the support force on the basis of the force as determined and position determining means 24 for determining a vertical position of the arm relative to the base member 15.

The position determining means 24 are further configured to determine a vertical speed of the pivot arm 7, and the control means 22 are further configured to control the driving means 21 for setting the support force on the basis of the vertical speed and the vertical position of the arm as determined.

FIGS. 2*a*-2*c* and 3*a*-3*c* show in top plan view and side view, respectively, how an operator 1 can make use of the device 3 as described above for loading a container 2 with items of luggage 6. The items of luggage 6 are supplied on a conveyor belt 42 in the direction indicated by the arrow 41. The operator 1 pivots the pivot arm 7 to a position such that the carrying element 4 will be located between an item of luggage 6 and the operator 1, whilst the height of the carrying element 4 is selected so that the load-carrying surface 5 thereof will be positioned at approximately the same level or slightly lower than the conveyor belt 42.

Figure 2A:
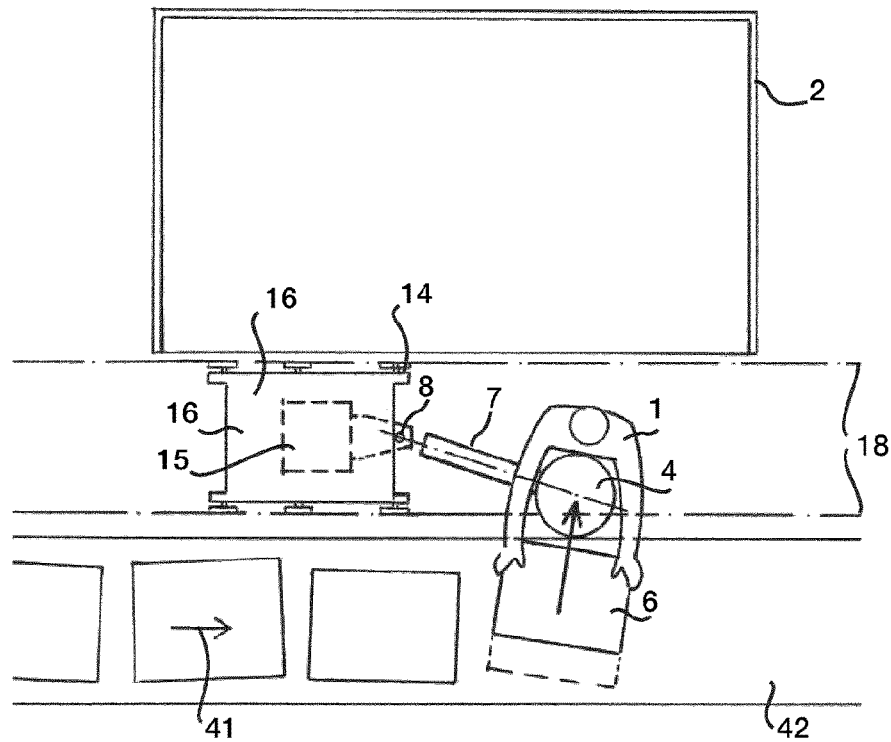
FIGS. 2a-2c show in top plan view three successive stages of the loading of the container by the operator by means of the device.
Figure 2B:
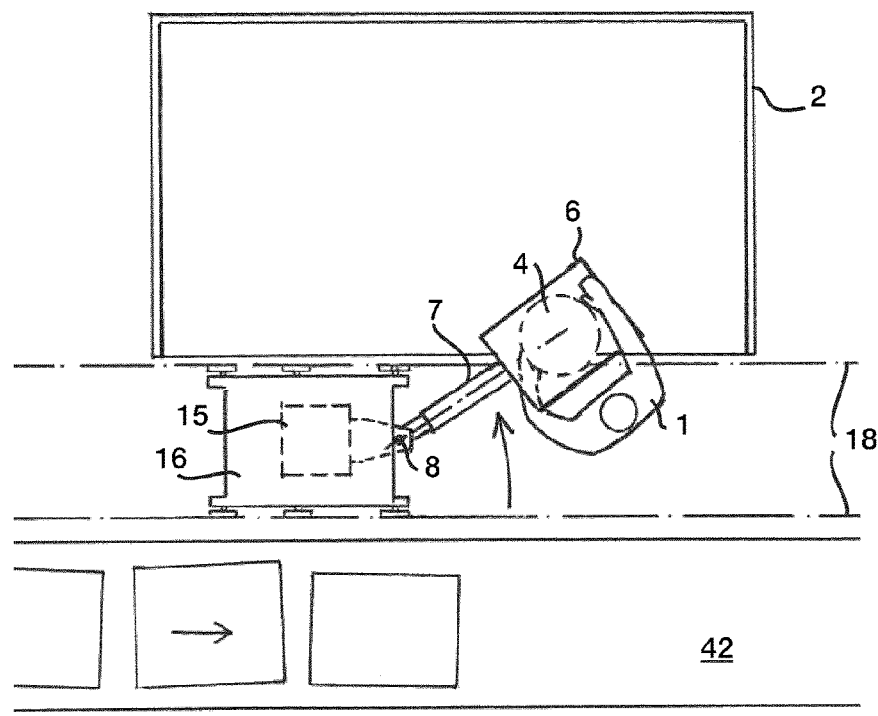
Figure 2C:
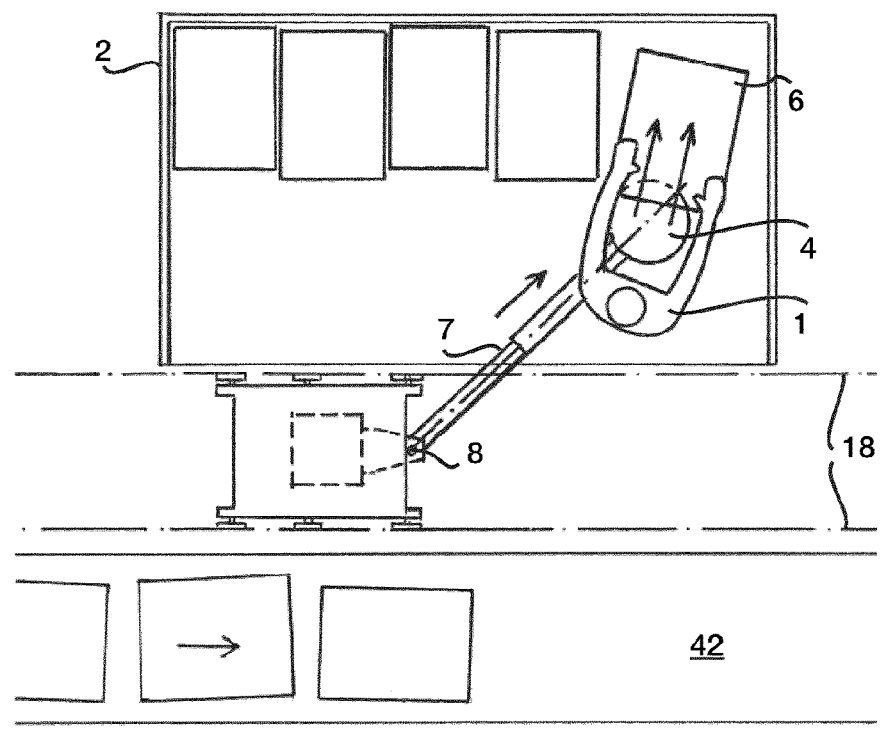
Figure 3A:
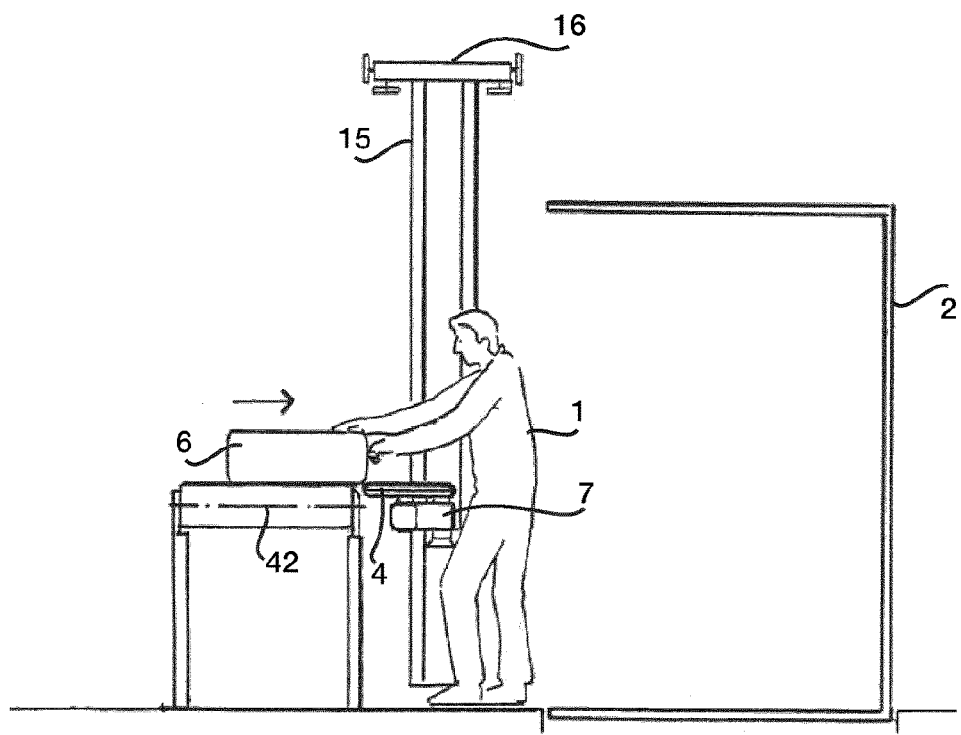
FIGS. 3a-3c show in side view three successive stages of the loading of the container by an operator.
Figure 3B:
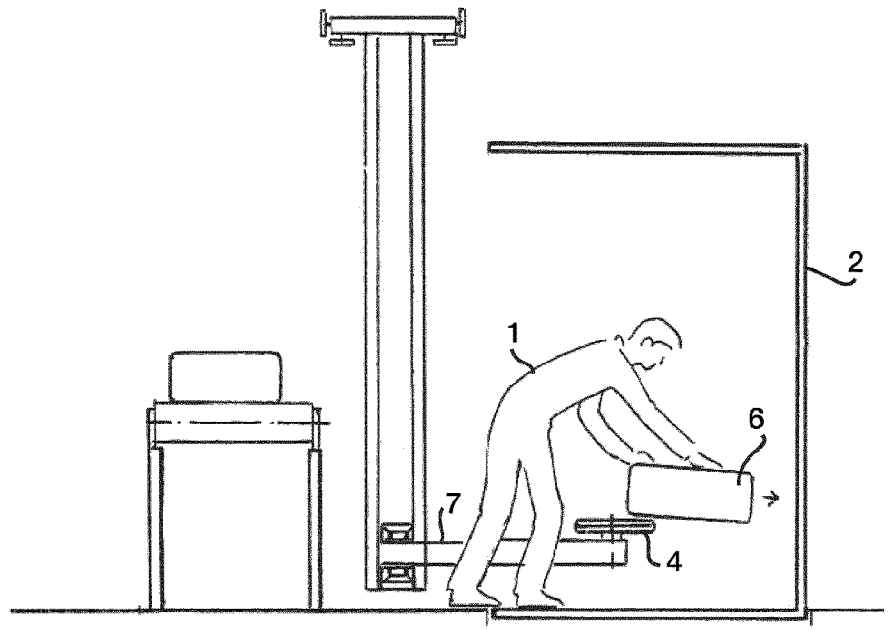
Figure 3C:
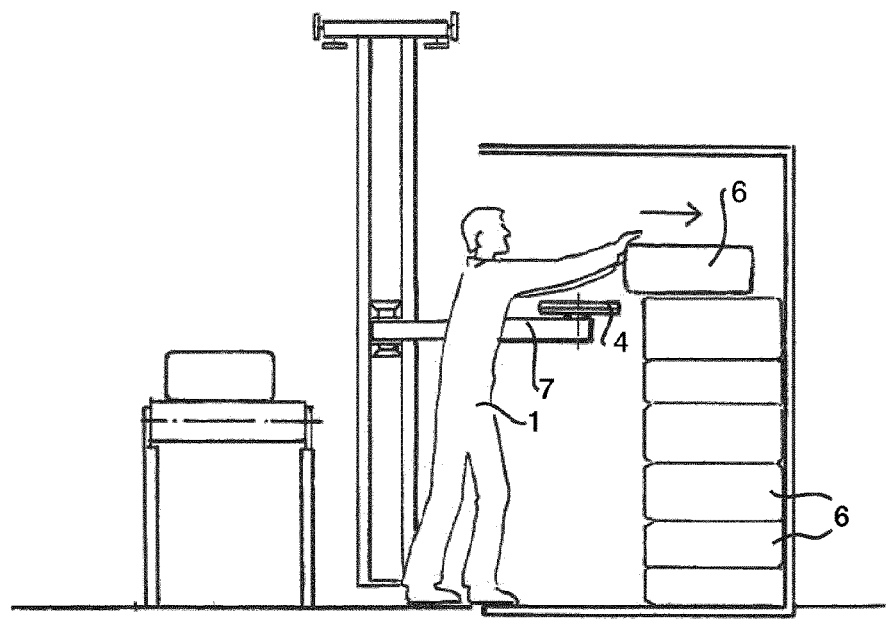

Because of the relatively small dimensions of the carrying element 4, it is possible for the operator 1 to pull the item of luggage 6 toward himself on the load-carrying surface 5 of the carrying element 4, as is shown in FIGS. 2*a* and 3*a*. The operator 1 can use both hands for this. Subsequently, the operator 1 will pivot the pivot arm 7 in any case in the direction of the container 2, positioning himself on the other side of the carrying element 4 and causing the carrying element to rotate along about the axis of rotation 12 by holding the carrying element 4 and possibly the item of luggage 6. Because the load-carrying surface 5 of the carrying element 4 is flat, without any guide parts such as balls that are used in the prior art, the risk of the item of luggage 6 being pushed from the load-carrying surface 5 as a result of a force being exerted on the item of luggage 6 is limited, in spite of the limited dimensions of the load-carrying surface 5.

Insofar as the movement of the carrying element 4 includes a vertical movement of the carrying element 4, the support system of the device 3 will (fully) support this vertical movement, so that the operator 1 will only need to make a limited effort. Once the operator 1 determines that a desired position of the carrying element 4 within the container 2 is reached, the operator 1 will fully release the carrying element 4 and push the item of luggage 6 from the load-carrying surface 5 and into the container 2. To do so, the operator 1 will position himself so that the carrying element 4 will be located between the operator 1 and the position within the container 2 to which the item of luggage 6 is to be pushed. Because of the relatively limited dimension of the load-carrying surface 5, an average person's arm's length will suffice to do this in a pleasant and ergonomically sound manner.

Figure 4:
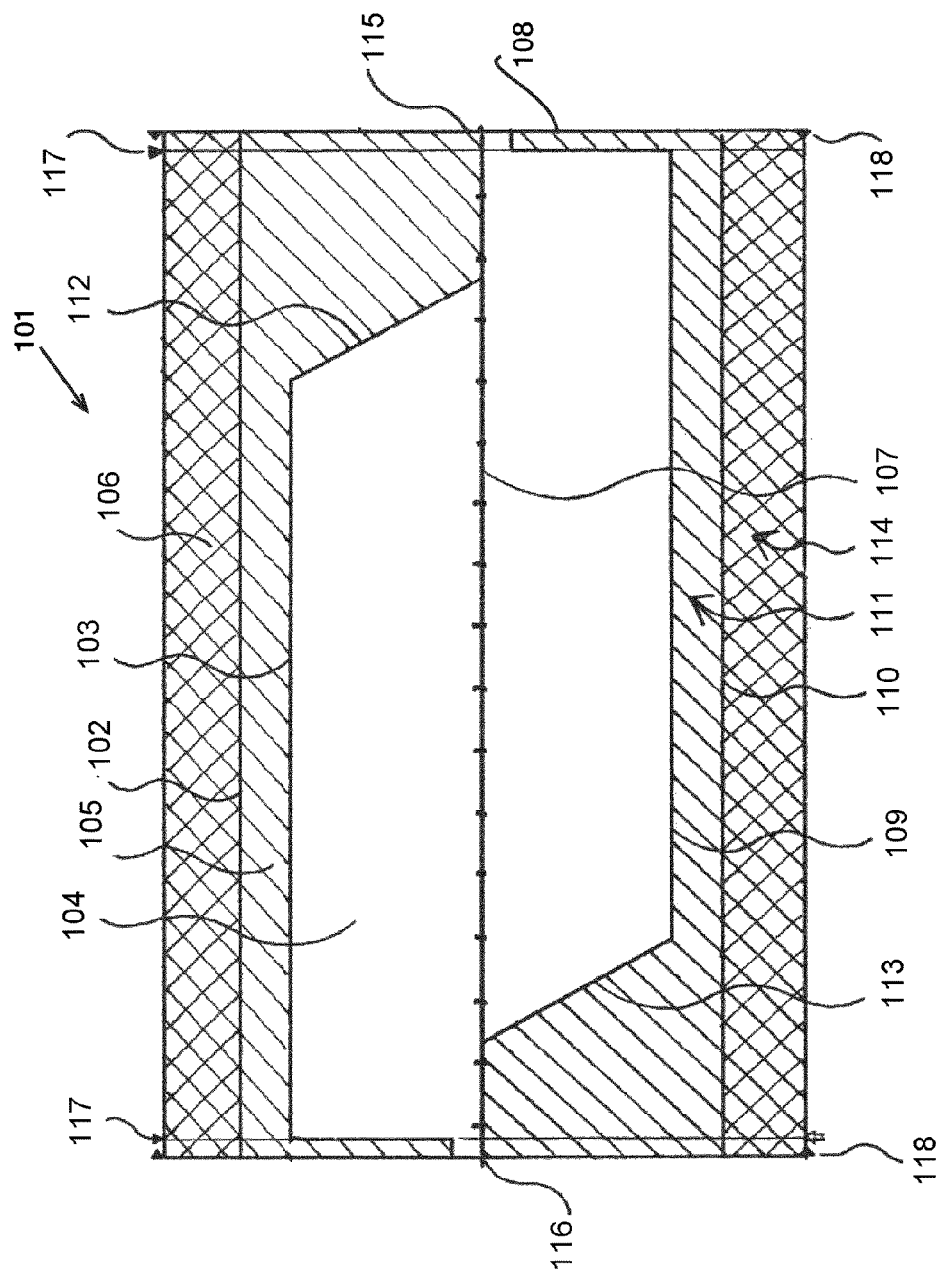
FIG. 4 shows an example of a relation between the vertical speed and the vertical position of the arm, in which the soft speed limit and the hard speed limit are shown.

FIG. 4 shows an example of a relation 101 between the vertical speed 108 and the vertical position 107 of the arm, in which the soft speed limit 103, 109 and the hard speed limit 102, 110 are shown.

As shown in this figure, the absolute value of the soft speed limit 103, 109 is lower than that of the hard speed limit 102, 110, respectively.

The control means are configured to control the driving means such that a speed-reducing support force is supplied to the moving means on the basis of the determined force when the vertical speed of the arm is higher than the soft speed limit 103, 19 and lower than the hard speed limit 102, 110. This is schematically indicated in the single-hatched areas 105, 111 in FIG. 4.

A speed-reducing support force in any case implies that the operator will sense a counterforce when he wishes to move the arm further in the same direction. The device can effect this by causing the support force to increase if the position of the arm is relatively low, for example, or by causing the support force to decrease if the position of the arm is relatively high, for example.

If the vertical speed of the arm is higher than the hard speed limit 102, 110, the control means will block the moving means. This indicates an exceptional situation that may lead to a dangerous situation. In FIG. 4 this is schematically indicated by the double hatched areas 106, 114.

In the present example, the soft speed limit 103, 109 comprises a soft downward speed limit 109 and a soft upward speed limit 103. The absolute values of these two soft speed limits 103, 109 can be the same, as shown in FIG. 4, but different values may be set for each.

Also the hard speed limit 110, 102 comprises a hard downward speed limit 110 and a hard upward speed limit 102.

The control means are configured to control the drive means such that a full support force on the basis of the determined force is provided to the moving means when the vertical speed of the arm is lower than the soft speed limit 103, 109. This is schematically shown in FIG. 4 in the non-hatched area indicated at 104.

As shown in FIG. 4, the soft speed limit 103, 109 depends on the vertical position of the arm relative to the base member. This dependence is indicated by numerals 112 and 113. The absolute value of the soft upward speed limit 103 will decrease as the arm moves upward. The advantage of this is that it is made difficult for an operator to reach the high vertical end position of the device. Dangerous situations are prevented in this manner.

The same goes for a soft downward speed limit 109. The absolute value thereof will decrease as the arm moves downward, such that the operator will only reach the low vertical end position 116 of the device with difficulty, if at all.

FIG. 4 further shows a limit switch 117, for example configured as a sensor which delivers a trigger signal to the control means when the arm is located at this position, in response to which the control means will control the drive means such that the drive means are stopped. FIG. 4 further comprises a mechanical end stop 118, which shows a vertical end position for the arm.

Figure 5:
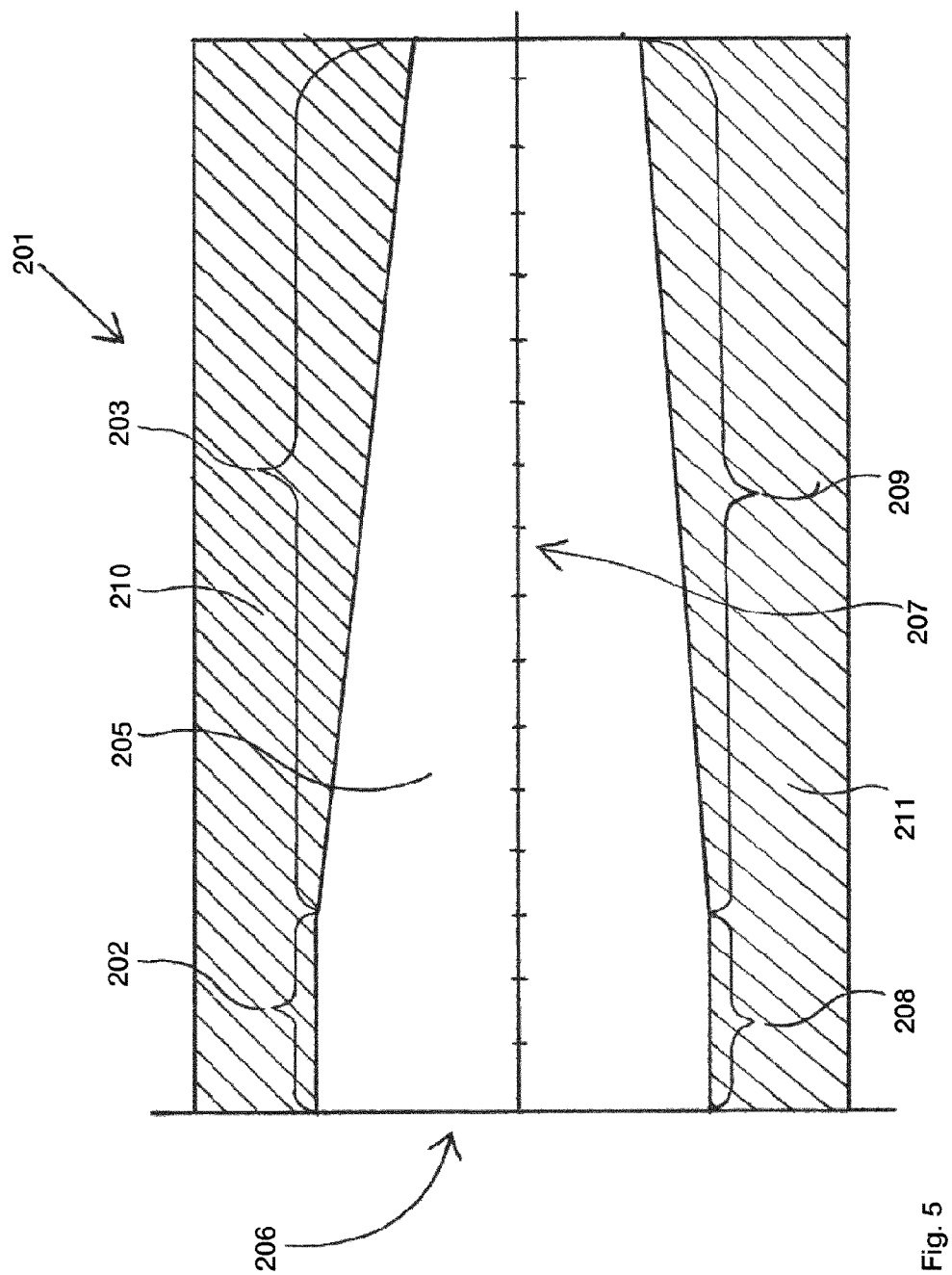
FIG. 5 shows an example of a relation between the acceleration of the arm and the weight of the object, in which the maximum allowable acceleration is shown.

FIG. 5 shows an example of a relation 201 between the acceleration 206 of the arm and the weight 207 of the object, in which the maximum allowable acceleration 202, 203 is shown.

The measuring means used here are configured to determine the weight 207 of the object, such as an item of luggage, when the arm is not being moved in vertical direction. The inventor has realised that that additional forces are also measured by the measuring means when the arm is moved in vertical direction. The acceleration and the friction that occur in that case affect the value for the weight of the object being determined by the measuring means. To prevent this variation, it is advantageous if the weight for the object is determined when the arm is not being moved in vertical direction.

The control means are configured to determine a vertical acceleration 206 of the arm, and to block the moving means when the determined vertical acceleration 206 of the arm exceeds a maximum acceleration 202, 208 and/or when the determined vertical acceleration 206 exceeds a predetermined speed limit 203, 209 that depends on the determined weight of the object.

In the present example, this acceleration limit 203, 209 is decreased linearly as weights 207 increase. This finds its origin in the notion that the external force exerted on the carrying element by the operator is constant. The fact is that the force exerted by the operator is a linear relation between the mass to be set moving by the operator multiplied by the acceleration that is imparted to the mass therewith.

When the determined vertical acceleration 206 exceeds the maximum acceleration 202, 208 and/or when the determined vertical acceleration 206 exceeds a predetermined acceleration limit 203, 209 that depends on the determined weight of the object, the control means will block the moving means. This is indicated in the single-hatched area 210, 211 in FIG. 5. If said limits are not exceeded, a full support force will be provided by the drive means so as to spare the operator. This is indicated in the non-hatched area 205 in FIG. 5.

Figure 6:
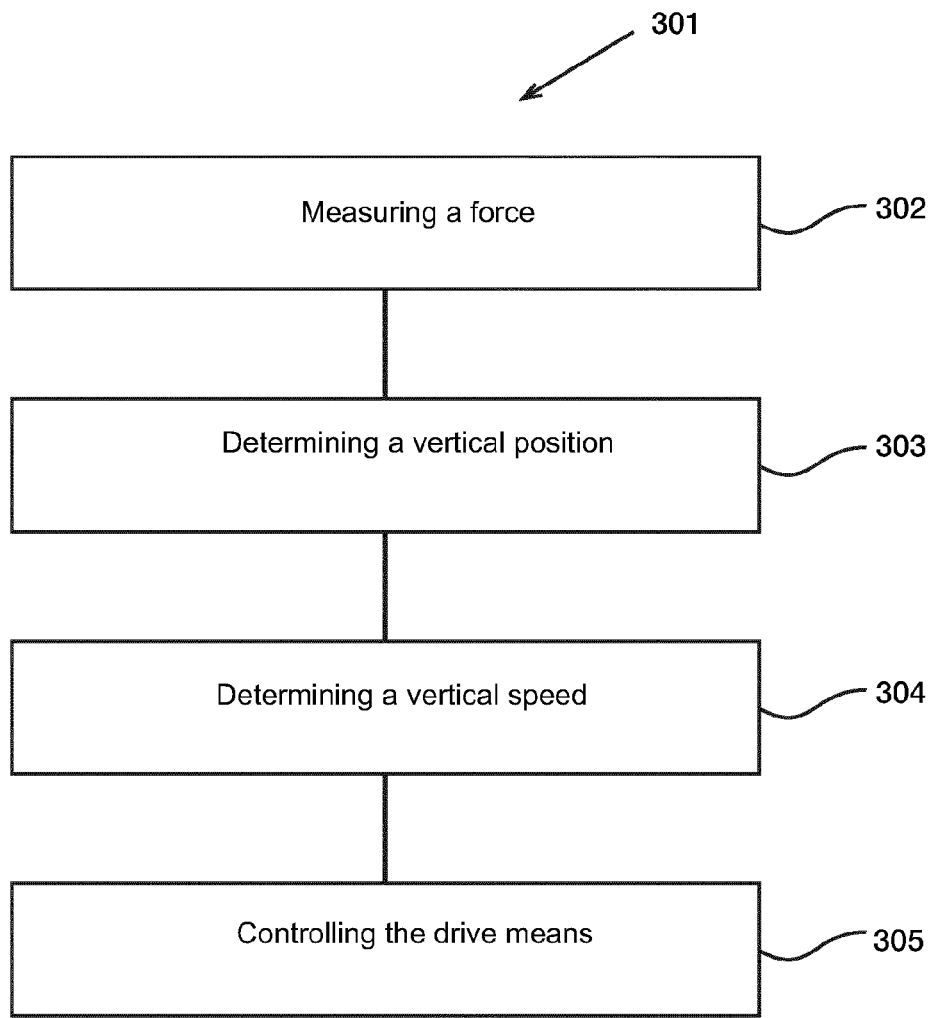
FIG. 6 shows an example of a flow diagram of an embodiment of the method according to the present invention.

FIG. 6 shows an example of a flow diagram 301 of an embodiment of the method according to the present invention.

The method comprises the steps of:
the measuring means determining/measuring (step 302) a force that acts between the carrying element and the second end of the arm;
the position determining means determining (step 303) a vertical position of the arm;
the position determining means determining (step 304) a vertical speed of the arm;
the control means controlling (step 305) the drive means for setting the support force on the basis of the determined force, the determined vertical speed and the determined vertical position of the arm.

The present invention is not limited to the examples as described in the foregoing in conjunction with the various figures. For a correct appreciation of the purport of the invention, the appended claims are relevant.

Text FIG. 6
302 Measuring a force
303 Determining a vertical position
304 Determining a vertical speed
305 Controlling the drive means

The invention claimed is:

1. A device for supporting luggage, comprising:
a base member;
an arm connected to the base member;
a carrying element positioned at a free end of the arm, the carrying element having a load-carrying surface adapted to support the luggage;
a guide configured to guide vertical movement of the arm along a length of the base member;
a driver configured to drive vertical arm movement;
a sensor configured to determine force acting on the carrying element and free end of the arm;
a position sensor configured to determine a vertical position of the arm and a vertical speed of the arm; and
a controller configured to control the driver and set a support force based on the determined vertical speed and vertical position of the arm;
wherein the vertical speed of the arm comprises a minimum speed limit and a maximum speed limit;
wherein the controller is further configured to control the driver such that a speed-reducing support force is provided to the guide based on the determined support force when the vertical speed of the arm is greater than the minimum speed limit and less than the maximum speed limit;
wherein the controller is further configured to block the guide when the vertical speed of the arm is greater than the maximum speed limit; and
wherein the controller is further configured to control the driver such that a maximum support force is provided to the guide based on the determined force when the vertical speed of the arm is less than the minimum speed limit.

2. The device according to claim 1, wherein the minimum speed limit depends on the vertical position of the arm relative to the base member.

3. The device according to claim 2, wherein the minimum speed limit comprises a minimum downward speed limit and a minimum upward speed limit.

4. The device according to claim 3, wherein the minimum downward speed limit decreases as the arm moves downward relative to the base member, and the minimum upward speed further decreases as the arm moves upward relative to the base member.

5. The device according to claim 1, wherein the maximum speed limit comprises a maximum downward speed limit and a maximum upward speed limit.

6. The device according to claim 1, wherein the sensor is configured to determine a weight of the luggage when the arm is vertically stationary, and wherein the controller is configured to determine vertical acceleration of the arm and blocking the guide when the determined vertical acceleration of the arm exceeds a maximum acceleration value and/or when the determined vertical acceleration exceeds a predetermined speed limit dependent on the determined weight of the luggage.

7. The device according to claim 6, wherein the acceleration limit decreases linearly as the weight increases.

8. The device according to claim 6, wherein the controller is configured to determine the vertical acceleration of the arm based on one of the force determined by the sensor, the determined vertical positions of the arm relative to the base member, and based on an acceleration sensor.

9. The device according to claim 1, wherein the carrying element is disc-shaped.

10. The device according to claim 1, wherein the arm is a telescoping arm.

11. A method for supporting luggage, comprising the steps of:
sensing with a sensor a force acting on a carrying element supported on an end of an arm attached to a base member;
determining a vertical position of the arm relative to the base member;
determining a vertical speed of the arm relative to the base member; and
controlling a driver configured to set a support force on the arm based on the force on the carrying element, the determined vertical speed of the arm, and the determined vertical position of the arm, wherein the vertical speed of the arm comprises a minimum speed limit and a maximum speed limit;
controlling the driver such that a speed-reducing support force is provided to the guide based on the force when the vertical speed of the arm is greater than the minimum speed limit and less than the maximum speed limit;
blocking the guide when the vertical speed of the arm is greater than the maximum speed limit; and
controlling the driver such that a maximum support force is provided to the guide based on the force when the vertical speed of the arm is less than the mimimum speed limit.

12. The method according to claim 11, wherein the minimum speed limit depends on the vertical position of the arm relative to the base member.

13. The method according to claim 12, wherein the minimum speed limit comprises a minimum downward speed limit and a minimum upward speed limit.

14. The method according to claim 13, wherein the minimum downward speed limit decreases as the arm moves vertically downward relative to the base member, and the minimum upward speed limit decreases as the arm moves vertically upward relative to the base member.

15. The method according to claim 11, wherein the maximum speed limit comprises a maximum downward speed limit and a maximum upward speed limit.

16. The method according to claim 11, wherein the sensor is configured to determine a weight of the luggage and the carrying element when the arm is vertically stationary, the controller is configured to determine vertical acceleration of the arm, and the controller is configured to block the guide when the determined vertical acceleration of the arm exceeds a maximum acceleration and/or when the determined vertical acceleration exceeds a predetermined speed limit dependent on the determined weight of the luggage.

17. The method according to claim 16, wherein the predetermined speed limit decreases linearly as the weight increases.

18. The method according to claim 16, wherein the step of determining vertical acceleration comprises determining vertical acceleration of the arm based on the force determined by the sensor or based on the vertical positions of the arm relative to the base member.

19. The method according to claim 16, further comprising an operator control unit adapted to be operated by hand, the operator control unit configured to control the controller, wherein the operator control unit is positioned on the carrying element and comprises an indicator configured to deliver a visual indication when the controller is activated.

* * * * *